No. 830,711. PATENTED SEPT. 11, 1906.
J. HABRIE.
BREAD CUTTER.
APPLICATION FILED JAN. 25, 1906.

2 SHEETS—SHEET 1.

Witnesses.

Inventor
Jules Habrie
By Geo. H. Strong atty

No. 830,711. PATENTED SEPT. 11, 1906.
J. HABRIE.
BREAD CUTTER.
APPLICATION FILED JAN. 25, 1906.

2 SHEETS—SHEET 2.

UNITED STATES PATENT OFFICE.

JULES HABRIE, OF SAN FRANCISCO, CALIFORNIA.

BREAD-CUTTER.

No. 830,711.     Specification of Letters Patent.     Patented Sept. 11, 1906.

Application filed January 25, 1906. Serial No. 297,789.

*To all whom it may concern:*

Be it known that I, JULES HABRIE, a citizen of the United States, residing in the city and county of San Francisco and State of California, have invented new and useful Improvements in Bread-Cutters, of which the following is a specification.

My invention relates to a device which is especially adapted for cutting bread and other substances into slices.

It consists in a combination of mechanism and in details of construction hereinafter described and claimed.

Figure 1:
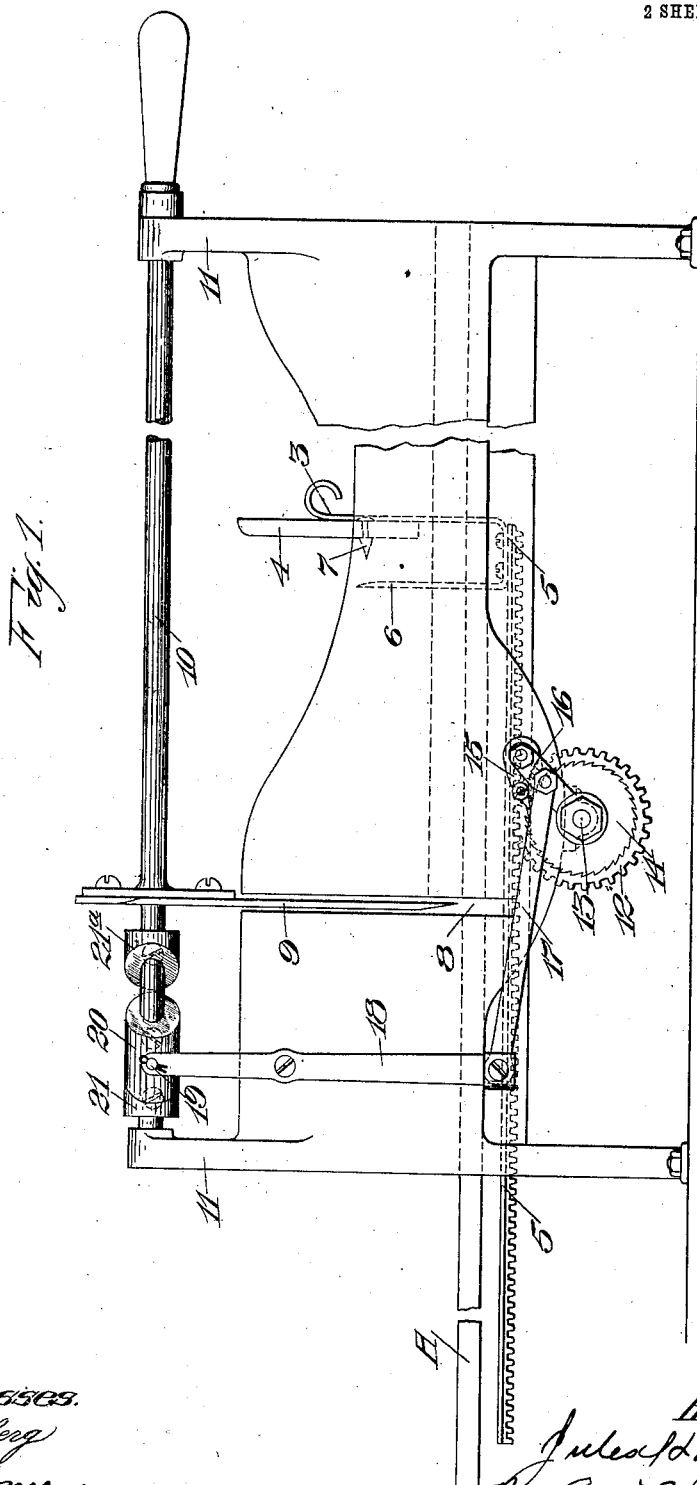
Figure 2:
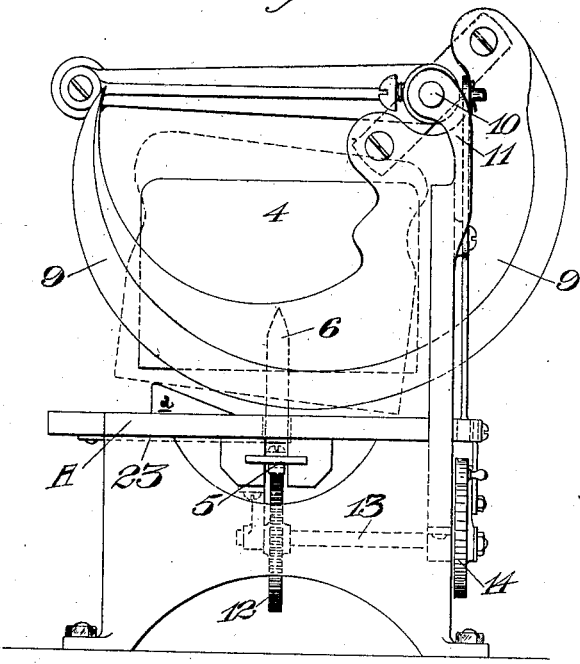
Figure 3:
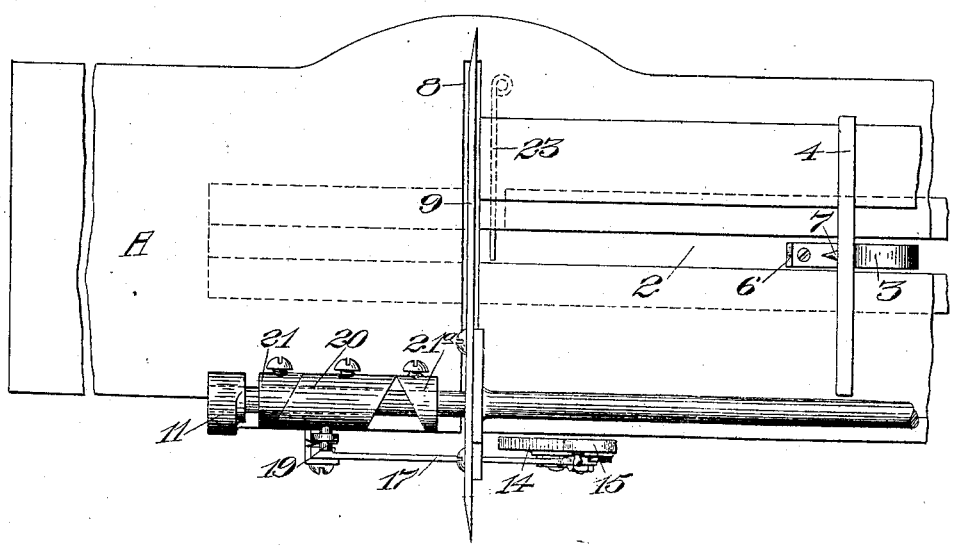

Referring to the accompanying drawings for a more complete explanation of my invention, Figure 1 is a side elevation of my invention. Fig. 2 is an end view of same. Fig. 3 is a plan view, partially broken away.

The base or support A may be made of any suitable or desired construction. In the present case I have shown it in the form of a table having one vertical side and an inclined surface *a* opposite thereto to form a support to steady the loaf of bread or other article, which will usually be rounded in shape. Longitudinally through the center of the table is a slot 2, in which a follower is adapted to travel. This slot serves for the passage of an arm 3, which carries a follower 4. This follower is attached to and carried by a rack-bar 5. Just in front of the follower I have shown an upwardly-extending spur 6, which is adapted to enter the bottom of the loaf when the latter is placed upon the table, and a similar spur or point 7 upon the follower will enter the rear end, thus steadying the loaf and preventing its slipping or rolling about. Transversely of the table and at the front end of the slot 2 is made another slot or channel 8, and this serves to allow the cutter 9 to be revolved so as to cross the loaf at each revolution, thus severing slices, the loaf being advanced by the follower, as will be hereinafter described. The cutter 9 is in the form of a cam, which is secured to a shaft 10, journaled upon standards 11 at each end of the table, the shaft thus standing parallel with and above the inner edge of the table, so that a drawing cut will be made by the edge of the cam-shaped blade.

If desired to have the crust held together in cutting bread, it will be seen that the cam-shaped knife will cut through all but a small angle or corner at the outer lower edge of the loaf, thus leaving the slices attached to each other for a more convenient handling.

In order to advance the loaf between each revolution of the cutting-knife, I have shown a spur-gear 12, mounted upon a transverse shaft 13 beneath the table, the teeth of the wheel engaging the teeth of the rack-bar 5, which carries the follower. Upon the outer end of the shaft 13 is a ratchet-wheel 14.

15 is a pawl loosely mounted in the end of a lever-arm 16, which arm turns loosely upon the shaft 13, so that it may be oscillated backward and forward by the mechanism actuated by the revolution of the cutter-shaft 10, and as the arm 16 oscillates it draws the pawl 15 back, passing loosely over the teeth of the ratchet while the cutter is passing through the loaf. Intermediate of this part of the operation and while the cutter is again passing over the upper part of its circuit the pawl acts to turn the ratchet and, through the gear-and-rack connection, to advance the follower and the loaf.

The lever-arm 16 is connected by a rod or pitman 17 with a vertically pivoted and oscillating lever 18. One of the special improvements in my present apparatus consists in the manner of operating this lever. The upper end of the lever is connected with a pin 19, projecting from a cam 20, which cam has its two ends parallel with each other and diagonal to the axis of the shaft 10, upon which the cam is loosely slidable. The cam is prevented from turning by the pin 19 engaging the upper end of the connecting-rod 18, and thus can have only a sliding motion on the shaft. This sliding motion is effected by means of two cams 21 and 21$^a$, which are fixed to the shaft 10 just beyond each end of the cam 20. These cams have also inclined faces diagonal to the axis of the shaft 10, and the inclines are so formed with relation to the inclines of the cam ends that first one of the cams 21 will engage the contiguous end of the inclined cam 20 and push it along the shaft, the incline of the other cam 21$^a$ being so disposed with relation to the opposite end of 20 that it will allow 20 to slide toward 21$^a$. Then as the shaft continues to revolve, the projecting point of the cam 21$^a$ engages the contiguous incline of the cam 20 and reverses its movement on the shaft, the cam 21 having meantime moved to such a point that it will allow the projecting end of the cam 20 at that side to pass the highest portion of the cam 21. Thus the reciprocation of the cam, the oscillation of the lever 18, and the movement of the pawl and ratchet are effected and no jointed links or returning-springs are required, which is a very considerable advantage in the operation of a device of this kind.

In order to check the advance of the follower after the loaf has been entirely sliced, I have shown a spring-arm 23, which is here shown as consisting of an elastic bar having one end fixed beneath the table and the other projecting so as to engage the upwardly-projecting spur on the rack-bar, and as the last of the teeth of the rack-bar will then be in engagement with the gear by which it is driven it will be manifest that a slight advance during the revolution of the cutter will be checked by the spring which will act to force the rack-bar back as each tooth of the gear slips past the end, thus preventing the follower from being moved up into the path of travel of the knife.

The pawl 15 is sufficiently weighted so that it will lie normally in contact with the teeth of the ratchet without the aid of any spring.

When it is desired to return the follower to its rearward position, the pawl is simply disengaged and turned backward around its pivot-point upon the lever 16. The follower can then be slid back in readiness for a new loaf.

Having thus described my invention, what I claim, and desire to secure by Letters Patent, is—

1. In an apparatus for cutting bread and the like, a table or support and guides for the bread, a shaft journaled longitudinally above one side of the table, a cam-shaped cutting-blade fixed to the shaft and movable transversely through slots in the table, a follower, a rack-and-pinion and ratchet-wheel mechanism by which the follower is advanced, and means for reciprocating the pawl of the ratchet, said means comprising a double-ended diagonally-faced cam, connections between said cam and the pawl-actuating lever, said cam being slidable upon the knife-carrying shaft, and having its diagonal faces parallel with each other, and other inclined-faced diagonally-ended cams fixed to said shaft opposite to the ends of the slidable cam, and having their faces inclined opposite to each other, substantially as herein described.

2. In a device for cutting bread and the like, a longitudinally-slotted table and guide adapted to support the article to be sliced, a shaft journaled longitudinally above one edge of the table, a cam-shaped cutting-blade fixed to the shaft and revoluble transversely with relation to the table, a rack guided and slidable beneath the slot of the table, an upwardly-projecting follower at the rear end of the rack having vertical and horizontal spurs to engage and steady the rear end of the article to be cut, a pawl-and-ratchet mechanism and a double-faced cam upon the knife-shaft, said cam having its ends inclined and arranged parallel with each other, and cams fixed to the shaft at each end of the double-faced cam and having oppositely-inclined faces, and connections whereby the reciprocations of the pawl and advancement of the follower are effected, said connections including a lever pivoted between its ends and having one end connected to the double-faced cam and a pitman connecting the other end of the lever to the pawl-and-ratchet mechanism, and an elastic bar extending transversely beneath the table and engaging the follower to limit the advance thereof.

3. In a device for cutting bread and like substances, a supporting table and guide, a shaft journaled longitudinally above the table, and a cam-shaped cutter revoluble with the shaft and transversely across the table, a follower and pawl-and-ratchet mechanism by which the bread is advanced between each sweep of the knife, a fulcrumed lever-arm having one end connected with the pawl, a slidable cam loosely mounted upon the cutter-shaft, said cam having a fixed pin connection with the lever, and other cams fixed to the shaft at opposite ends of the slidable cam, said slidable cam having its opposite ends inclined and with the inclines parallel with each other, and said other cams having inclined inner ends with the inclines oppositely arranged relative to each other.

In testimony whereof I have hereunto set my hand in presence of two subscribing witnesses.

JULES HABRIE.

Witnesses:
 HENRY P. TRICOU,
 S. H. NOURSE.